United States Patent [19]
Johansson

[11] Patent Number: 5,130,083
[45] Date of Patent: Jul. 14, 1992

[54] HYDRIDE RESISTANT SPACER FORMED FROM INTERLOCKING STRIPS

[75] Inventor: Eric B. Johansson, Wrightsville Beach, N.C.

[73] Assignee: General Electric Company, San Jose, Calif.

[21] Appl. No.: 745,293

[22] Filed: Aug. 15, 1991

[51] Int. Cl.⁵ .................................................. G21C 3/34
[52] U.S. Cl. ................................... 376/441; 376/462; 376/438; 376/442
[58] Field of Search ............... 376/441, 462, 442, 438; 976/DIG. 79, DIG. 73, DIG. 75; 165/69, 169

[56] References Cited

U.S. PATENT DOCUMENTS

| | | | |
|---|---|---|---|
| 3,646,994 | 3/1972 | Piepers et al. | 165/69 |
| 4,152,205 | 5/1979 | Kropfl | 376/441 |
| 4,190,494 | 2/1980 | Olsson | 376/442 |
| 4,597,937 | 7/1986 | Sakurai et al. | 376/441 |

*Primary Examiner*—Brooks H. Hunt
*Assistant Examiner*—Meena Chelliah
*Attorney, Agent, or Firm*—Robert R. Schroeder

[57] ABSTRACT

A spacer for a fuel bundle is disclosed in which a grid type construction provides an approximation to a traditional ferrule spacer. First and second sets of diagonally extending strips of Zircaloy are utilized extending along opposite diagonals across a square sectioned spacer. One set of strips is disposed in a first parallel array along a first diagonal, with each strip of the set being spaced from other strips of the set at rod width spaced intervals along the second and remaining diagonal. The other set of strips is disposed in a second parallel array along an second diagonal, with each strip of the set being spaced from the other strips of the set at rod width spaced intervals along the first diagonal. The strips of both arrays are bent in a zigzag configuration as they extend diagonally across each fuel bundle with successive legs defined between bends in the strip including a diagonal leg, a horizontal leg, a diagonal leg (in the same diagonal direction), and a vertical leg with the secession being repeated to form the required diagonal length. The diagonal elements are provided with opposing protruding tabs, these tabs defining interlocking cell boundaries diagonally around each individual fuel rod. The strips are engaged one towards another with the opposed protruding tabs interleaved to connect the diagonally extending strips together into a mutually interlocking grid. There results an eight sided cell around each fuel rod with the tabs of the strips along a first diagonal forming first opposite diagonal cell boundaries, the tabs of strips along the second diagonal forming second opposite diagonal cell boundaries, and the horizontal and vertical legs closing the eight sided cell between the cell diagonals.

6 Claims, 7 Drawing Sheets

HYDRIDE RESISTANT SPACER FORMED FROM INTERLOCKING STRIPS

This invention relates to spacers utilized with boiling water nuclear reactor fuel bundles. More particularly, a spacer construction is disclosed in which a grid of interlocked Zircaloy strips is fabricated and interlocked along opposite diagonals within a square fuel rod spacer band to obtain an improved spacer grid. The disclosed spacer grid has the advantage of ferrule type spacer construction without the required double thicknesses of metal utilized when ferrules surround adjacent fuel rods within a fuel bundle.

BACKGROUND OF THE INVENTION

In order that this invention can be fully appreciated, the details of the construction of a boiling water nuclear fuel bundle will first be set forth. Thereafter the dynamics of fuel bundle operation will be partially disclosed. Emphasis will be placed on the functional interrelationship of a spacer within the upwardly flowing coolant within the nuclear fuel bundle located in the typical core of a nuclear reactor.

Fuel bundles in boiling water nuclear reactors include a matrix of vertical fuel rods, a lower tie plate for supporting the matrix of vertical fuel rods, and an upper tie plate for maintaining the matrix of fuel rods in vertical relation overlying the lower tie plate. A fuel channel is placed between the upper and lower tie plates around the fuel rods for defining a vertical flow path through the fuel bundle along the vertical length of the fuel bundle. The lower tie plate functions to permit the inflow of water at the bottom of the fuel bundle; the upper tie plate functions to permit the outflow of water and generated steam at the top of the fuel bundle.

The fuel bundles are elongate; typically they have a 8 by 8 inch square section and are about 160 inches in length. The contained fuel rods within the fuel bundle are in matrices on the order of at least 7 by 7 with more modern fuel designs having densities in the fuel bundles exceeding 10 by 10. The result is that absent a system of restraint, the fuel rods would tend to come into wearing and abrading contact with one another during the operational life of the fuel bundle. Such wearing and abrading contact would be responsive to the effects of creep and the dynamics of fluid flow about the fuel rods. Creep is a differential growth of the metal of the fuel rod cladding which occurs in the pressurized radiation environment of the fuel bundle causing the fuel rods to bend within the fuel bundle with age. The dynamics of fluid flow about the fuel rods causes the fuel rods to vibrate towards and away from one another during reactor operation.

To maintain the fuel rods in their designed side-by-side relationship, so-called fuel rod spacers are employed. These fuel rod spacers surround each fuel rod individually at selected vertical intervals along the length of the fuel bundle. Typically, between 5 to 7 spacers are distributed vertically along the length of the fuel bundle. Each spacer individually surrounds each fuel rod and confines that fuel rod to its designed location within the matrix at the elevation of the spacer. In short, the distributed spacers prevent abrading contact between the fuel rods, and maintain uniform rod spacing.

The spacers must exist interior of the fuel bundles in the upwardly flowing fluid stream between the lower tie plate and the upper tie plate. The spacers have a disadvantage of adding resistance to this required upward fluid flow. This resistance to fluid flow, if not controlled can lead to undesirable consequences. These undesirable consequences include the limitation of the power output of the fuel bundle as well as contributing to local or core wide instabilities including thermal hydraulic and nuclear thermal hydraulic instabilities in the upper two phase region of the fuel bundle.

To reduce the phenomenon of pressure drop, it has been the tendency of the prior art to make the material of the spacers as thin as possible.

Spacers are made of two materials. One material is a spring steel sold under the designation Inconel. These spacers can be made extremely thin; unfortunately, the spring material, even when very thin, is a relative high absorber of neutrons.

A more desirable spacer construction includes the use of a metallic alloy with low neutron absorption known as Zircaloy. While this metal is not a strong as Inconel, it neutron absorbing cross section is much more favorable.

One of the most successful designs of Zircaloy spacers includes the use of so-called ferrules at each rod location. A ferrule is a round cylinder surrounding the fuel rod but spaced a distance from the fuel rod by stops and a spring biasing the fuel rod onto the ferrule stops. When the fuel rod is biased onto the stops interior of an individual ferrule, a precise spatial relationship is maintained between the outside of the fuel rod and the inside of the ferrule. It has been found that this design is very favorable to the heat exchanging fluid flow passing over the fuel rod at and above the fuel rod at the location where it is surrounded by the ferrule.

In order to minimize pressure drop in the coolant flow and minimize neutron absorption, the ferule wall thickness should be as small as possible. Unfortunately, the dissolving of hydrogen carried within the water coolant of the nuclear reactor prohibits the use of Zircaloy sheet less than 0.020 inches thick. When Zircaloy sheet of lesser thickness is utilized to construct a spacer, the Zircaloy after exposure to the hydrogen rich environment interior of the reactor becomes brittle. Unfortunately, this brittle state of the hydrogen is particularly aggravated when the reactor is cold. It is when the reactor is cold and individual fuel rods are manipulated into and out of the fuel bundles for inspection and replacement that the spacers undergo relatively great stress. Simply stated, Zircaloy when used always has a thickness of at least 0.020 inches.

In a square array of ferrules, each ferrule is surrounded by and contacts four adjacent ferrules. At each of these contact points there is a double thickness of Zircaloy. If this double thickness could be eliminated, the spacer pressure drop and neutron absorption could be reduced.

It has been known to try and avoid these double thickness of Zircaloy by utilizing an "egg crate" or grid design in the fabrication of spacers. In such a design, the strips of metal form respective right angle partitions between adjacent fuel rods. Only a single thickness of Zircaloy is disposed between each of the fuel rods.

Unfortunately, this type of "grid" design has its own short coming.

In the upper portion of the fuel bundle, the liquid coolant rises with increasing fractions of generated steam. Typically, the relatively slowly upwardly moving water concentrates adjacent the fuel rods; the higher velocity upwardly flowing steam concentrates in the spatial intervals between the fuel rods. That spatial interval having the largest unobstructed area for the rapidly moving upwardly flowing steam is found along the diagonal spatial intervals between a matrix of fuel rods aligned in regular row and column intervals. Unfortunately, and with an "egg crate" or grid type spacer, the cross over between the strips of sheet metal forming the spacer occurs within this spatial interval having the largest unobstructed area. Consequently, undue pressure drop results. For this reason, the ferrule construction of spacer has been preferred over the grid type construction despite the higher neutron absorption of the ferrule type spacers.

SUMMARY OF THE INVENTION

A spacer for a fuel bundle is disclosed in which a grid type construction provides an approximation to a traditional ferrule spacer. First and second sets of diagonally extending strips of Zircaloy are utilized extending along opposite diagonals across a square sectioned spacer. One set of strips is disposed in a first parallel array along a first diagonal, with each strip of the set being spaced from other strips of the set at rod width spaced intervals along the second and remaining diagonal. The other set of strips is disposed in a second parallel array along an second diagonal, with each strip of the set being spaced from the other strips of the set at rod width spaced intervals along the first diagonal. The strips of both arrays are bent in a zigzag configuration as they extend diagonally across each fuel bundle with successive legs defined between bends in the strip including a diagonal leg, a horizontal leg, a diagonal leg (in the same diagonal direction), and a vertical leg with the succession being repeated to form the required diagonal length. The diagonal elements are provided with opposing protruding tabs, these tabs defining interlocking cell boundaries diagonally around each individual fuel rod. The strips are engaged one towards another with the opposed protruding tabs interleaved to connect the diagonally extending strips together into a mutually interlocking grid type construction. There results an eight sided cell around each fuel rod with the tabs of the strips along a first diagonal forming first opposite diagonal cell boundaries, the tabs of strips along the second diagonal forming second opposite diagonal cell boundaries, and the horizontal and vertical legs closing the eight sided cell between the cell diagonals. The diagonal cell boundaries define at their spatial interval between the rods small diagonally aligned square sectioned apertures between the fuel rods. These square sectioned apertures—each being smaller than the cells containing and confining the fuel rods—are positioned to permit the relatively rapidly upwardly venting steam to pass through the spacer with minimal interference from the material of the spacer with resultant reduced pressure drop through the spacer. The diagonal strips are each given a length and typically confined within a surrounding square sectioned band to form a unitary spacer assembly. A system of stops and springs is disclosed for bias of the fuel rods to a center location with in the eight sided ferrule. The horizontal and vertical legs are shared between cells to provide single thickness of neutron absorbing metallic strips for all eight sides of each cell. Accordingly, there is provided a grating type spacer approximating a ferrule spacer in its eight sided cell having the advantage of sharing walls on four of its eight sides for reduced neutron absorption.

OTHER OBJECTS, FEATURES AND ADVANTAGES

An object of this invention is to disclose in a grid type spacer array a spacer construction that provides the benefits of ferrule spacer construction eliminating the double wall thickness which occurs where adjacent ferrules are joined.

An additional object of this invention is to provide a spacer which can be acceptably constructed from Zircaloy having acceptable thickness to resist becoming brittle due to hydrogen absorption.

A further object of this invention is to set forth a grid type spacer array where the grid material avoids the regions where high velocity steam flow occurs.

BRIEF DESCRIPTION OF THE DRAWINGS

Other objects, features and advantages of the disclosed invention will become more apparent after referring to the following specification and attached drawings in which.

DESCRIPTION OF THE PREFERRED EMBODIMENT

Figure 1:
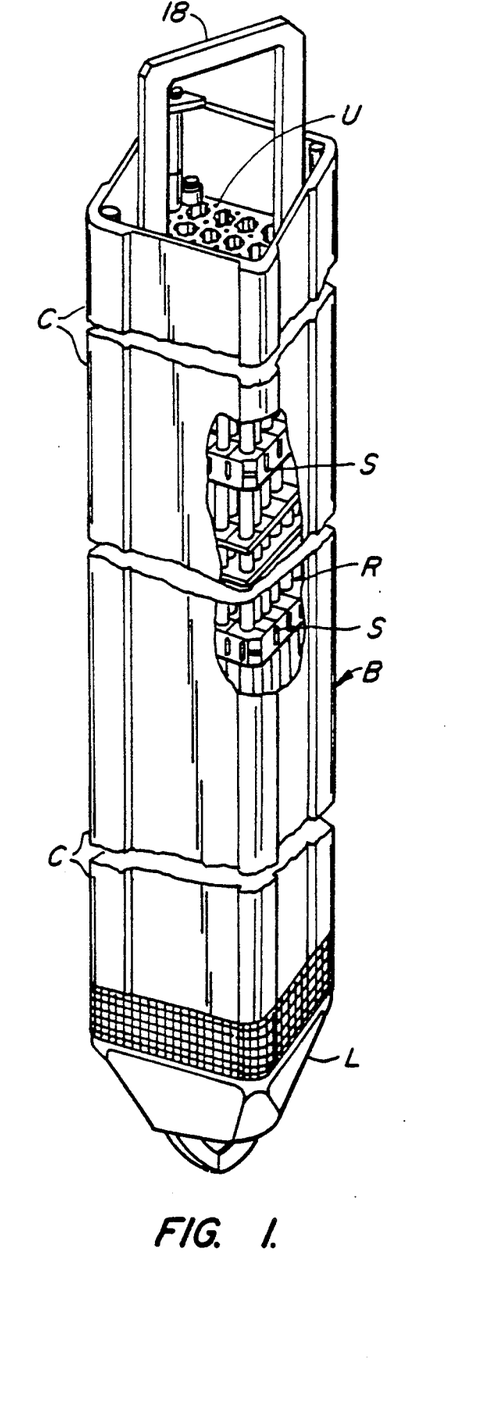
FIG. 1 is a perspective view of a fuel bundle illustrating the component portions of the fuel bundle and the location of typical spacers.
Figure 2:
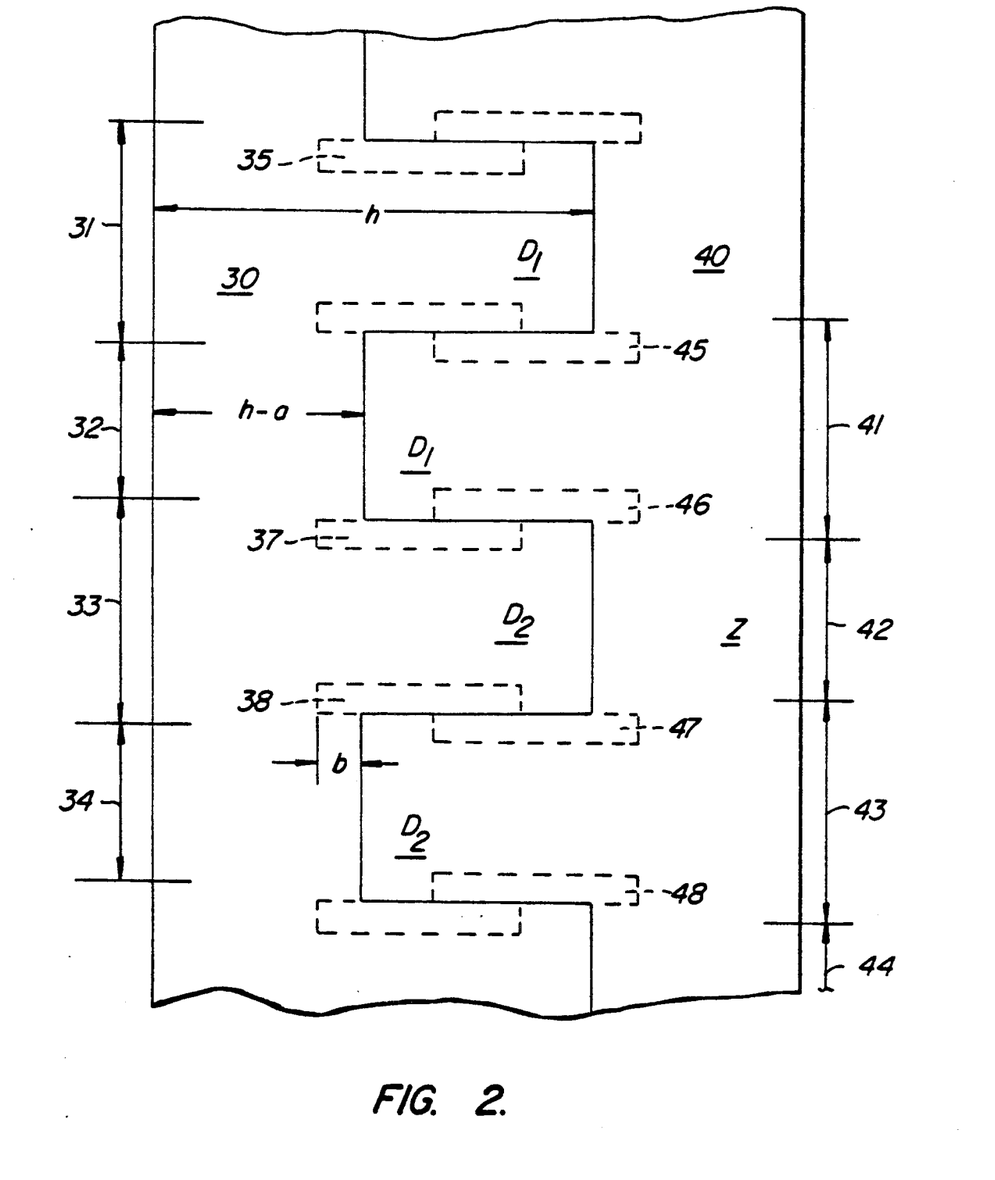
FIG. 2 is a plan view of a Zircaloy metal band outlining a pattern on the band for cutting into two continuous strips having the configuration necessary for the practice of this invention.

Referring to FIG. 1, a fuel bundle B for a boiling water nuclear reactor is illustrated. The fuel bundle includes a lower tie plate L and an upper tie plate U confining a square section matrix of fuel rods R. Lower tie plate L serves to support and permit the in flow of liquid coolant. Upper tie plate U holds the matrix of fuel rods R in a vertical upstanding position. Certain of the fuel rods are threaded at lower tie plate L extend upper tie plate U and tie the two tie plates together to form a unitary assembly.

Between lower tie plate L and upper tie plate U a square section channel C surrounds the fuel bundle. It is the function of the square section channel C to confine fluid flow interior of the fuel bundle.

The fuel bundle is elongate. It is in the order of 160 inches long being approximately 5 inches square in dimension. The reader will understand that of necessity the view here illustrated is cut away so that although the full elongate length of the fuel bundle B cannot be seen, some of the constructional details can be seen.

A section of the fuel bundle has been broken away at the channel C. In the broken away section, the spacers S which are the subject of this invention can be seen.

Figure 5:
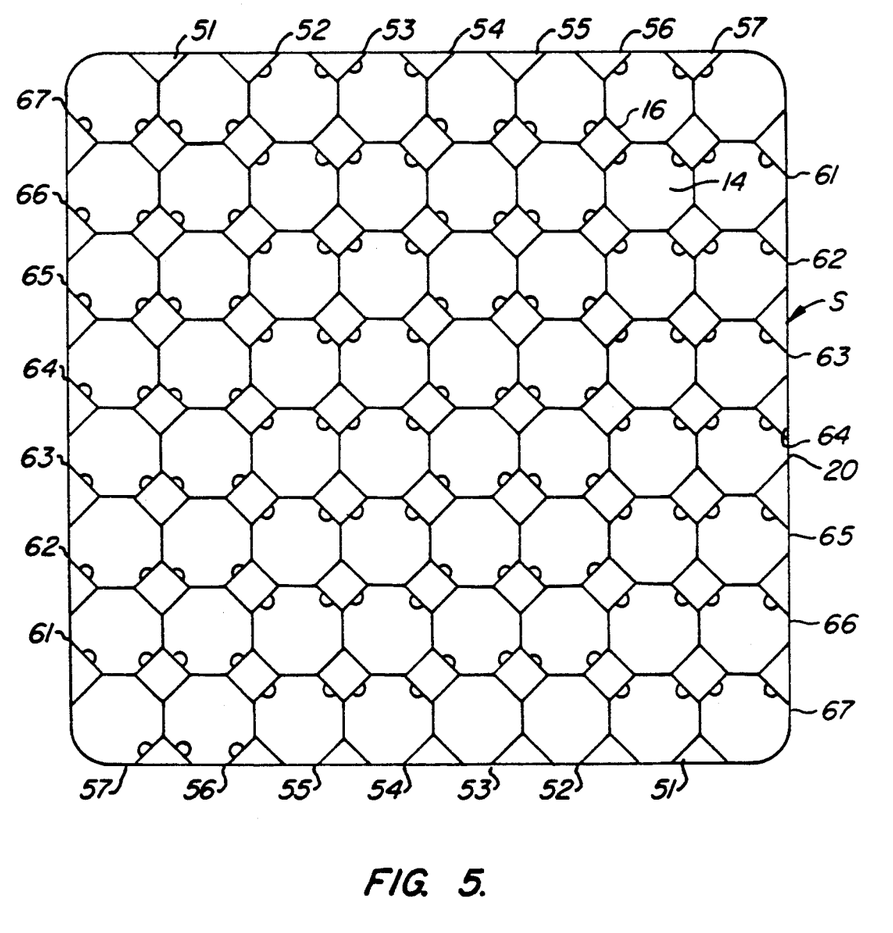
FIG. 5 is a top plan view of the first and second sets of spacer strips illustrated in FIGS. 4A and 4B brought together to form the interlocking grid type spacer of this invention with the resultant spacer forming the eight sided ferrule type cell and the square sectioned steam vent aperture diagonally of adjacent fuel rods; and, FIG. 6A and 6B are respective plan and side elevation views of the spacers of this invention in the assembled disposition.

Referring to FIG. 5, disclosed invention includes discrete cells 14, these cells for each confining a fuel rod R. Diagonally of the cells 14 there are located diagonally aligned square apertures 16 which apertures 16 enable optimum flow of the steam/water mixture. The whole spacer S is surrounded by a band 20 on its square sectioned side. Although the reader will understand that the square section here illustrated confines an 8 by 8 matrix of fuel rods other densities are contemplated, such as 9 by 9 or 10 by 10.

Further, the reader will understand that the FIG. 5 does not disclose placement of large central water rods. It will be understood by those skilled in the art that the disclosed spacer can be modified to include such common appurtenances.

Having set forth the overall construction of the fuel bundle and the location in general configuration of the spacer, its assembly will now be set forth.

Figure 3A:
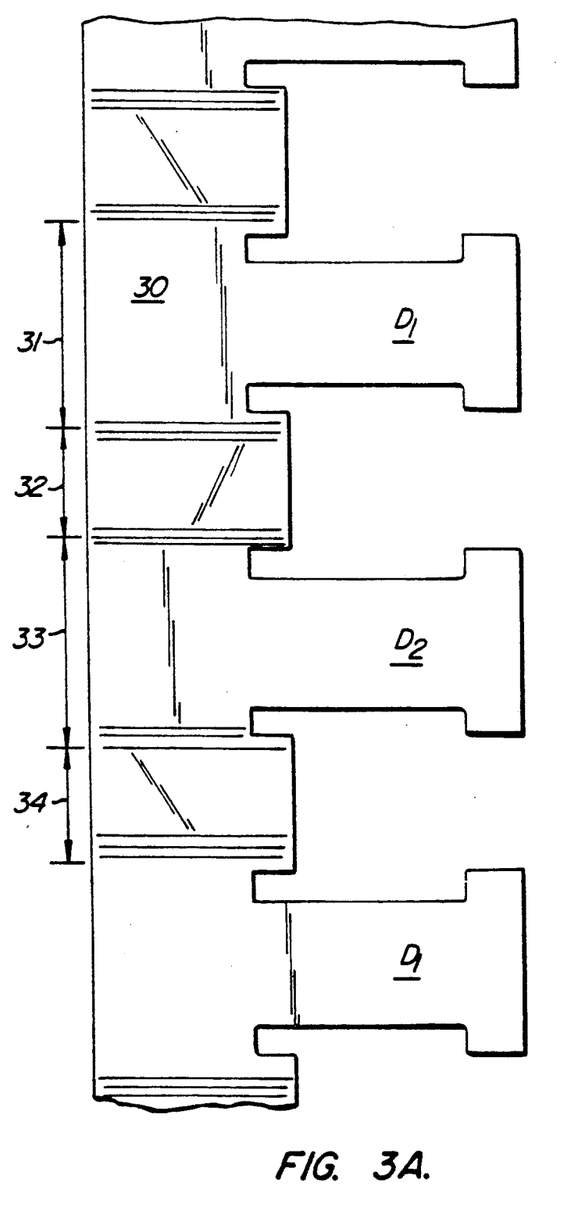
FIGS. 3A and 3B are respective side and top plan view of a strip severed in FIG. 2 which has been bent into the desired shape for forming a component of the disclosed spacer.
Figure 3B:
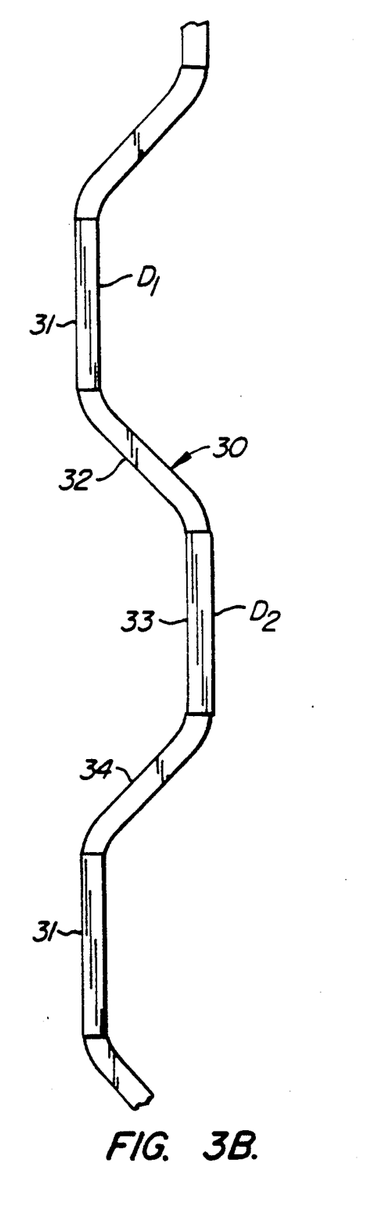

The interior grid of the spacer is composed of interlocking bent strips. A portion of a strip is shown in FIGS. 3A and 3B, where FIG. 3A is a side view and FIG. 3B is a top view. In FIG. 3A, the left side 30 of the strip is continuous, and tabs $D_1$, $D_2$ project from the continuous strip 30. 45° bends are made at the dashed lines, dividing the strip into regions 31, 32, 33, 34. Regions 31, 33 with tabs are parallel to each other but are offset.

The interior grid is built up using strips of different lengths, oriented diagonally inside a spacer band. Half of the strips are oriented parallel to one diagonal with the tabs upward, and half are oriented parallel to the other diagonal with the tabs oriented downward.

Figure 4A:
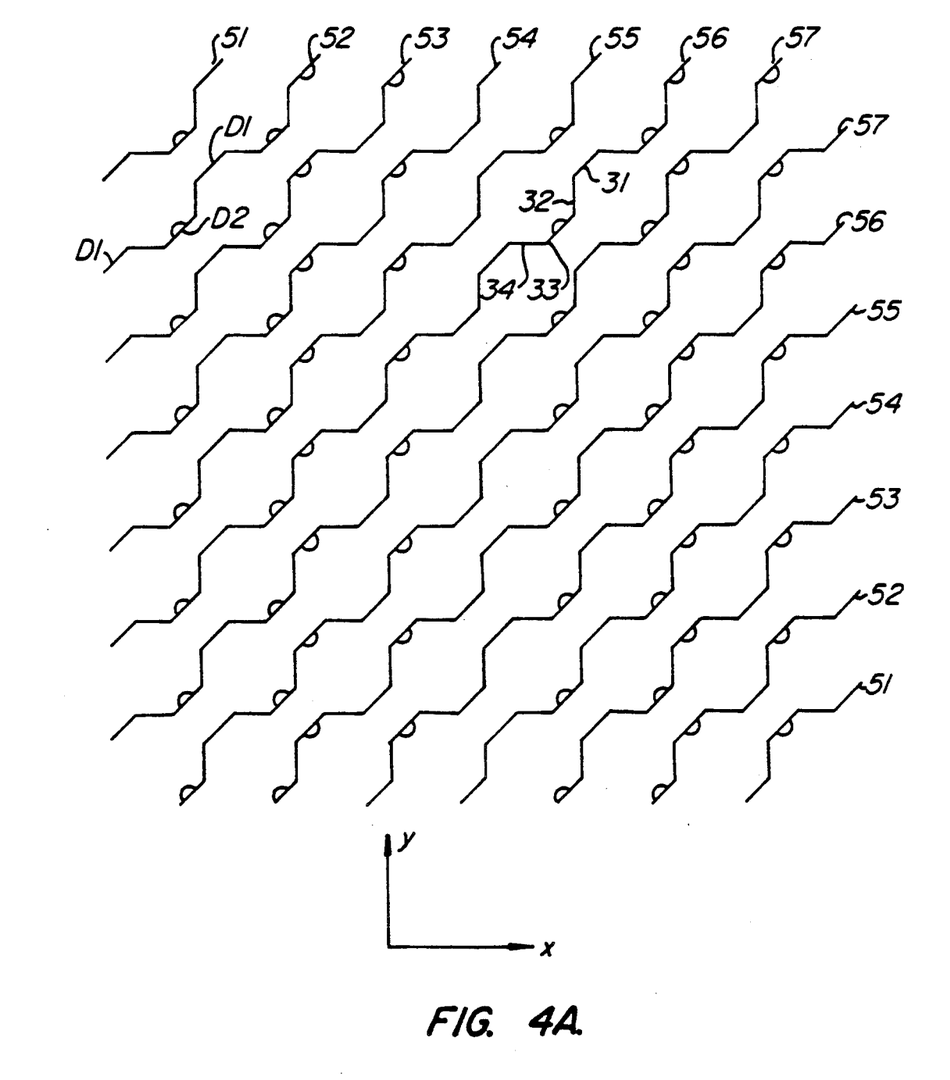
FIG. 4A is top plan view of a first set of interlocking strips disposed diagonally from upper right to lower left of a square sectioned spacer.

Referring to FIG. 4A two sets of diagonal strips 51-57 are utilized. Strips 51 are the shortest diagonal strips. Strips 57 are the longest diagonal strips. Referring to strip 56 an exemplary labeling of the component parts has occurred. Section 31 is a diagonal cell boundary. Section 32 is here vertically oriented with respect to the square section of the spacer. Section 33 is again diagonally aligned. Finally, section 34 appears horizontally aligned with respect to the spacer. This horizontal and vertical zigzag between the diagonal sections extends for the length of each diagonal required to extend across this square section paper.

Figure 4B:
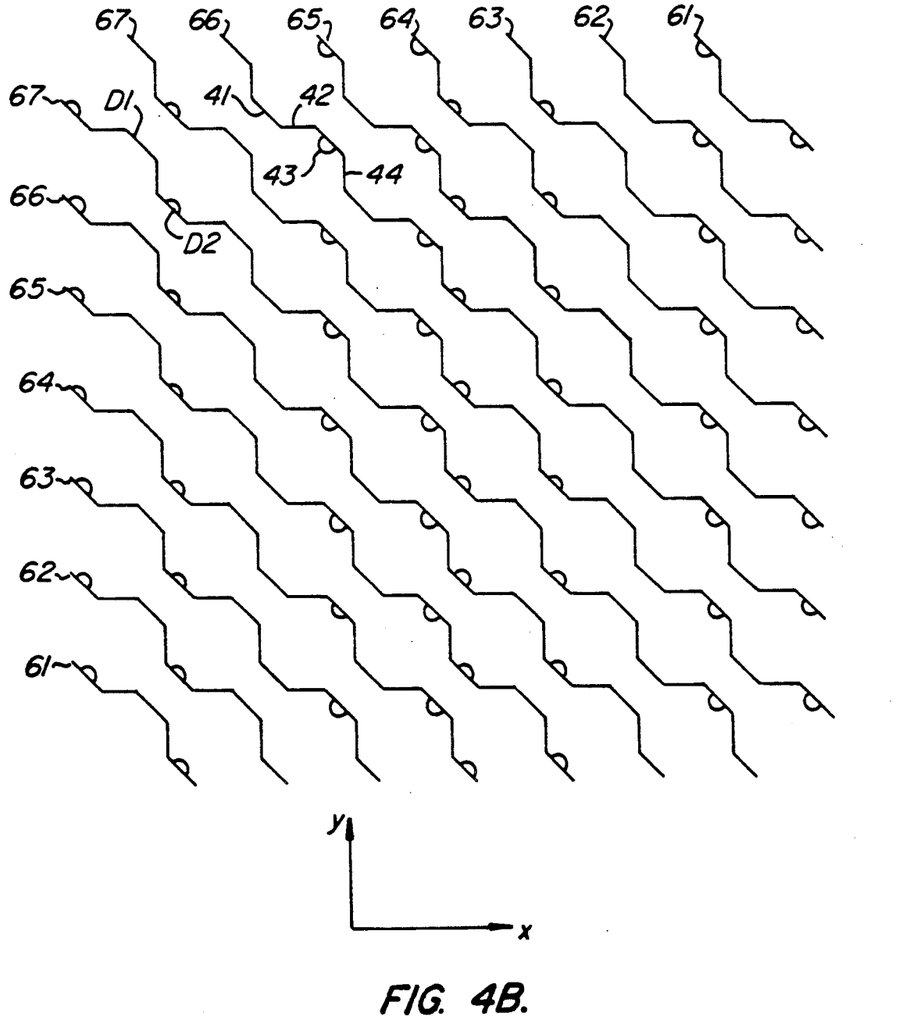
FIG. 4B is top plan view of a second set of interlocking strips disposed diagonally from upper left to lower right of a square sectioned spacer.

FIG. 4B is similar, except that the diagonals are rotated 90° with respect to the diagonals of FIG. 4A, and the tabs extend downward. Specifically, strips 61-67 complete the diagonal array. As before, these strips include tabs $D_1$, $D_2$ and sections and diagonal cell boundary 41, horizontal member 42, diagonal cell boundary 43 and vertical member 44 as before the required length of the rods are placed. Referring to FIG. 5, the plan view completed spacer is illustrated. It can be seen that first and second sets of strips 61-67 have been interleaved to first and second sets of strips 51-57. The strips when coming together define individual cells 14 and square cells 16 to define the respective spacer S.

Figure 6A:
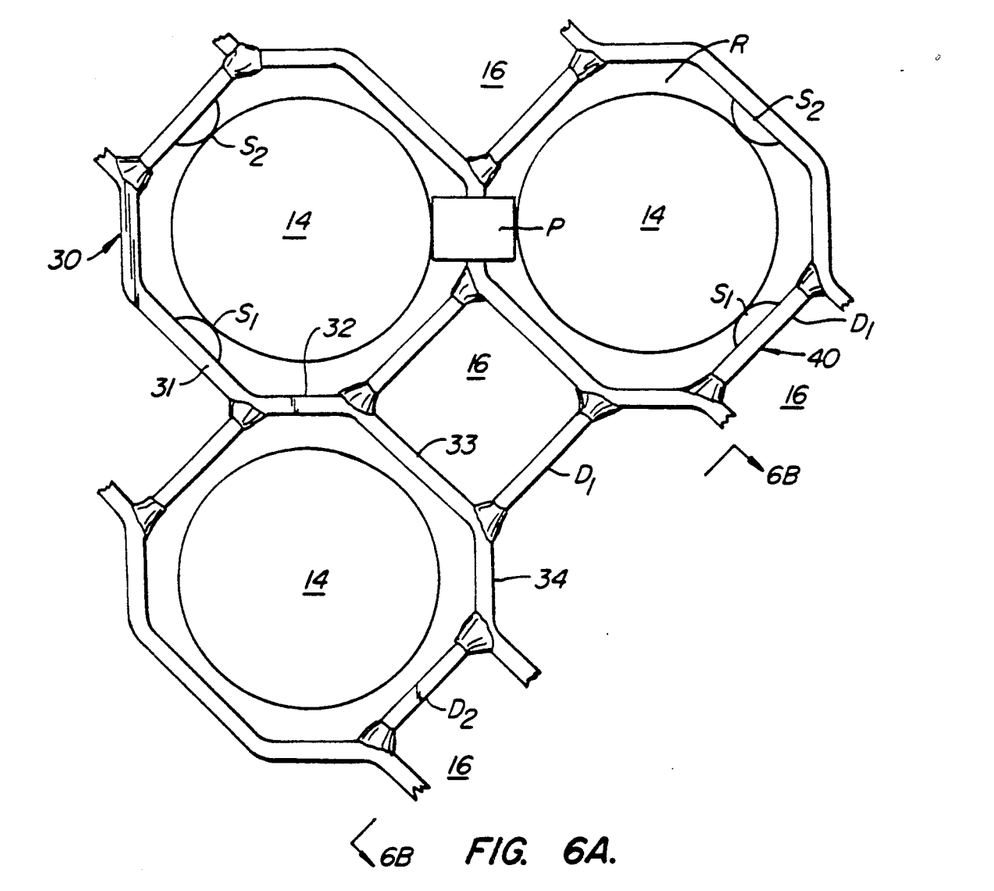
Figure 6B:
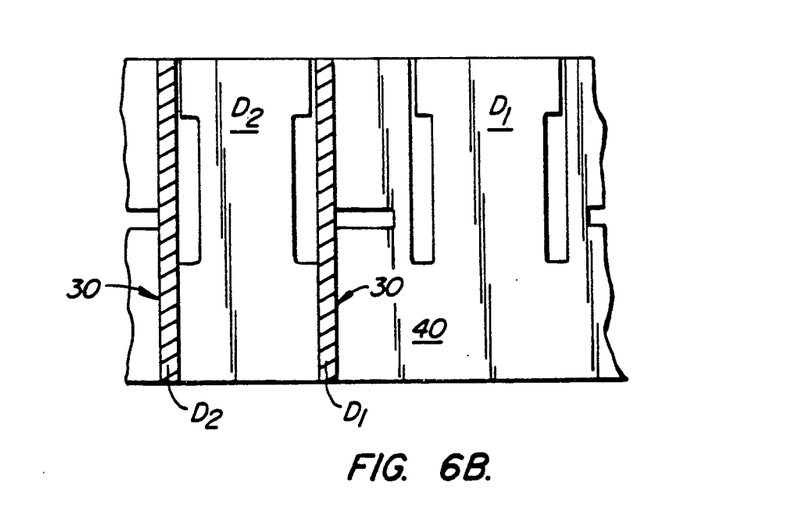

Referring to FIGS. 6A and 6B, the assembled disposition of these members can be understood. Referring to FIG. 6A, strips 30 running from upper left to lower right and strips 40 running from upper right to lower left are illustrated. Strips 40 at tabs $D_1$, $D_2$ form diagonal cell boundaries around cells 14.

In an analogous manner, strips 30 at their respective tabs $D_1$, $D_2$ form diagonal cell boundaries.

It can be seen that each of the cells comprises an eight-sided cell for individually surrounding the fuel rods R. As is conventional, stops $S_1$ and $S_2$ are configured opposite a spring assembly P in each cell. Spring assembly P biases the rod R onto the respective stops $S_1$, $S_2$ thereby assuring placement within the matrix.

It will be understood that their results a spacer construction S including eight-sided cells 14 and a square sectioned steam venting aperture 16 it will be noted that at the boundaries 32, 34 and 42, 44, single thicknesses of Zircaloy exist between the fuel rods. It will thus be understood that the illustrated spacer construction constitutes a combination of the ferrule type construction and the grid construction. At the same time, it provides the steam vent cells 16 and reduce quantities of Zircaloy. The reader will understand that this invention will admit a modification. For example, the modification can include more dense matrices.

What is claimed is:

1. A gird type spacer for a fuel bundle providing ferrule spacer like cells about the individual fuel rods within a nuclear fuel bundle having, a matrix of vertical fuel rods, a lower tie plate for supporting said matrix of vertical fuel rods and permitting the inflow of coolant to said fuel bundle, an upper tie plate for maintaining said matrix of vertical fuel rods vertical and permitting the outflow of water coolant and generated steam, a fuel bundle channel surrounding said fuel rods between said tie plates for defining an isolated flow path to said fuel bundle between said tie plates, and a plurality of spacers defining individual cells about each said fuel rods within said channels for restraining the side-to-side movement of said fuel rods, an improved spacer comprising:

first and second sets of diagonally extending strips extending along opposite diagonals;

said first set of strips is disposed in a first parallel array along a first diagonal, with each strip of the set being spaced from other strips of the set at a rod width spaced intervals along the second and remaining diagonal;

said second set of strips is disposed in a second parallel array along an second diagonal, with each strip of the set being spaced from the other strips of the set at rod width spaced intervals along the first diagonal;

said strips of both arrays are bent in a zigzag configuration with successive legs defined between bends in the strip including a diagonal leg for forming a diagonal cell side, a horizontal leg for forming a horizontal cell side, a diagonal leg for forming a diagonal cell side, and a vertical leg for forming a vertical cell side;

each said diagonal elements of each said strip being provided with opposing protruding tabs, said tabs defining interlocking cell boundaries diagonally around each individual fuel rod;

said strips engaged one towards another with said opposed protruding tabs interleaved to connect the diagonally extending strips together into a mutually interlocking grid type construction whereby there results an eight sided cell around each fuel rod with the tabs of the strips along a first diagonal forming first opposite diagonal cell boundaries, the tabs of strips along the second diagonal forming second opposite diagonal cell boundaries, and the horizontal and vertical legs closing the eight sided cell between the cell diagonals.

2. The invention of claim 1 and wherein said diagonal cell boundaries define at their spatial interval between the rods small diagonally aligned square sectioned apertures between the fuel rods to permit the relatively rapidly upwardly venting steam to pass through the spacer with minimal interference from the material of the spacer with resultant reduced pressure drop through the spacer.

3. The invention of claim 2 and wherein said square sectioned apertures are each smaller than the cells containing and confining the fuel rods.

4. The invention of claim 1 and wherein said diagonal strips are each given a length diagonally of and confined within a surrounding square sectioned band to form a unitary spacer assembly.

5. The invention of claim 1 and including:
- a system of stops and springs disposed within said cells for bias of the fuel rods to a center location with in the eight sided ferrule.

6. The invention of claim 1 and wherein said horizontal and vertical legs of said strips aligned with one diagonal overlie said horizontal and vertical legs of strips aligned with the other diagonal, providing a single thickness of material between adjacent fuel rods.

* * * * *